United States Patent Office 2,754,317
Patented July 10, 1956

2,754,317

METHOD OF MAKING FLUORINATED PHOSPHATE ESTERS

James C. Conly, Santa Monica, Calif., assignor to Douglas Aircraft Company, Inc., Santa Monica, Calif.

No Drawing. Application March 16, 1951,
Serial No. 216,091

8 Claims. (Cl. 260—461)

This invention relates to a new method for preparing fluorinated alkyl esters of orthophosphoric acid and to the resulting new fluorinated phosphate esters as new chemical compounds, and relates more particularly to a commercially feasible or practicable process for the production of certain fluorinated phosphate esters and the resulting new chemical compounds of the general formula: $(RO)_3PO$ where R represents a fluorinated alkyl radical having from 2 to 10 carbon atoms and having a $CF_2$ or $CF_3$ group, that is, having a fluorinated carbon atom with at least 2 fluorine atoms, bonded to the carbon atom connected to an oxygen of the phosphate radical and the carbon atom bonded to the oxygen of the phosphate radical is bonded, in addition to the bond to this oxygen, only to atoms which are members of the group consisting of hydrogen and carbon; or a fluorinated alkoxyalkyl radical containing from 3 to 10 carbon atoms with at least 2 carbon atoms in the alkyl portion thereof and having a $CF_2$ or $CF_3$ group, that is, having a fluorinated carbon atom with at least 2 fluorine atoms, bonded to the carbon atom connected to an oxygen of the phosphate radical and the carbon bonded to the oxygen of the phosphate radical is bonded, in addition to the bond to this oxygen, only to atoms which are members of the group consisting of hydrogen and carbon. My invention more particularly relates to the production of such fluorinated phosphate esters in which the substituents are fluorinated alkyl radicals.

The compounds of this invention prepared by the novel process of this invention are generally nearly colorless liquids having mild pleasant odors. These esters have exceptional utility as flexibilizing plasticizers for fluorinated polymers, as non-flammable hydraulic fluids, or as stable liquid heat-transfer agents, in addition to many other uses based on their low viscosity at low temperatures, high stability and extraordinary fire resistance.

In general, in accordance with my invention, I react phosphorous oxychloride with an aqueous solution of an alkali metal salt of a fluorinated alkanol or a fluorinated alkoxyalkanol, having in either case a fluorinated carbon atom with at least 2 fluorine atoms bonded to the carbinol carbon atom and the carbinol carbon atom, in addition to being bonded to oxygen, is bonded only to hydrogen or carbon atoms. Preferably the $POCl_3$ is added dropwise with stirring to the aqueous solution of the alkali metal alcoholate and the reaction preferably carried out at a temperature within the range of −5° C. to +5° C., and in general it will be found advantageous to effect the reaction below about 10° C. The preferred alkali metal alcoholate is the sodium alcoholate, that is, the sodium salt of the fluorinated alkanol or the sodium salt of the fluorinated alkoxyalkanol, although other alkali metal salts may be used, particularly including potassium. It is an especially important discovery in accordance with my invention that this method is effective and that new chemical compounds can be made with respect to such fluorinated alkanols or fluorinated alkoxyalkanols in which the carbinol carbon atom is bonded only to hydrogen or carbon and to a fluorinated carbon atom having at least 2 fluorine atoms, that is, to a $CF_2$ or a $CF_3$ group. This includes the primary, secondary and tertiary alcohols. The method in accordance with my invention has been found to be successful in giving good yields of good quality fluorinated phosphate esters.

My invention will be illustrated by the following example:

EXAMPLE

*Tris 2,2,3,3,4,4,4-heptafluorobutyl phosphate*

51.2 grams of freshly distilled $POCl_3$ was cooled to 5° C. and added dropwise with good stirring to a solution of sodium 2,2,3,3,4,4,4-heptafluorobutyl alcohol at 5° C. made by mixing 44.4 grams of sodium hydroxide and 226 grams of the pure alcohol (boiling point 95–6° C.) in 500 cc. of water. The $POCl_3$ was added at such a rate that the temperature at no time exceeded 5° C. and after addition was complete the mixture was stirred at 5° C. for two hours. At the end of this time it was allowed to warm to room temperature and stirred one-half hour in addition. Then the heavy ester layer was separated from the water layer (which was washed with ethyl ether to remove any residual ester) and the oil layer washed with 2% NaOH, and subsequently with water. It was then dried. The product was already of good purity, but was further purified by distilling (boiling point 70° C. at 0.7 mm.). This gave substantially pure tris 2,2,3,3,4,4,4-heptafluorobutyl phosphate.

The fluorinated alkanols which may be used in accordance with my invention may be represented by the following formula $$C_nF_{2n+1-m}H_mCF_2\overset{R}{\underset{R'}{C}}-OH$$

in which $m$ is less than or equal to $2n+1$ and $n$ may have any value from 0 to 4, and R and R' may be hydrogen or alkyl radicals. These particularly include those represented by the following formulas:

$CF_3CH_2OH$
$CF_3CF_2CH_2OH$
$CF_3(CF_2)_2CH_2OH$
$CF_3(CF_2)_3CH_2OH$
$CF_3(CF_2)_4CH_2OH$
$CF_3(CF_2)_5CH_2OH$
$CF_3(CF_2)_6CH_2OH$
$CF_3CHOHC_2H_5$
$CF_3CHOHC_3H_7$
$CF_3CHOHC_4H_9$
$CF_3CHOHC_5H_{11}$
$CF_3CHOHC_6H_{13}$
$CF_3CHOHC_7H_{15}$
$CF_3CHOHC_8H_{17}$
$CF_3CF_2CHOHC_2H_5$
$CF_3CF_2CHOHC_3H_7$
$CF_3CF_2CHOHC_4H_9$
$CF_3CF_2CHOHC_5H_{11}$
$CF_3CF_2CHOHC_6H_{13}$
$CF_3CF_2CHOHC_7H_{15}$
$CF_3CF_2CHOHC_8H_{17}$
$CF_3(CF_2)_2CHOHC_2H_5$
$CF_3(CF_2)_2CHOHC_3H_7$
$CF_3(CF_2)_2CHOHC_4H_9$
$CF_3(CF_2)_2CHOHC_5H_{11}$
$CF_3(CF_2)_2CHOHC_6H_{13}$
$CF_3(CF_2)_2CHOHC_7H_{15}$
$CF_3(CF_2)_2CHOHC_8H_{17}$
$CF_3(CF_2)_3CHOHC_2H_5$
$CF_3(CF_2)_3CHOHC_3H_7$
$CF_3(CF_2)_3CHOHC_4H_9$
$CF_3(CF_2)_3CHOHC_5H_{11}$
$CF_3(CF_2)_3CHOHC_6H_{13}$ $CF_3(CF_2)_3CHOHC_7H_{15}$
$CF_3(CF_2)_3CHOHC_8H_{17}$
$CF_3(CF_2)_4CHOHC_2H_5$
$CF_3(CF_2)_4CHOHC_3H_7$
$CF_3(CF_2)_4CHOHC_4H_9$
$CF_3(CF_2)_4CHOHC_5H_{11}$
$CF_3(CF_2)_4CHOHC_6H_{13}$
$CF_3(CF_2)_4CHOHC_7H_{15}$
$CF_3(CF_2)_4CHOHC_8H_{17}$
$CF_3(CF_2)_5CHOHC_2H_5$
$CF_3(CF_2)_5CHOHC_3H_7$
$CF_3(CF_2)_5CHOHC_4H_9$
$CF_3(CF_2)_5CHOHC_5H_{11}$
$CF_3(CF_2)_5CHOHC_6H_{13}$
$CF_3(CF_2)_5CHOHC_7H_{15}$
$CF_3(CF_2)_5CHOHC_8H_{17}$
$CF_3C(CH_3)_2OH$
$CF_3C(C_2H_5)_2OH$
$CF_3C(C_3H_7)_2OH$
$CF_3C(C_4H_9)_2OH$

The fluorinated alcohols may be primary, secondary or tertiary. The fluorinated alkoxyalkanols particularly include those represented by the following formulas:

$C_2H_5OCH_2CF_2CF_2CH_2OH$
$C_3H_7OCH_2CF_2CF_2CH_2OH$
$C_4H_9OCH_2CF_2CF_2CH_2OH$
$C_5H_{11}OCH_2CF_2CF_2CH_2OH$
$C_6H_{13}OCH_2CF_2CF_2CH_2OH$
$C_2H_5OCH_2CF_2CF_2CF_2CH_2OH$
$C_3H_7OCH_2CF_2CF_2CF_2CH_2OH$
$C_4H_9OCH_2CF_2CF_2CF_2CH_2OH$
$C_5H_{11}OCH_2CF_2CF_2CF_2CH_2OH$
$C_6H_{13}OCH_2CF_2CF_2CF_2CF_2CH_2OH$
$C_2H_5OCH_2(CF_2)_4CH_2OH$
$C_3H_7OCH_2(CF_2)_4CH_2OH$
$C_4H_9OCH_2(CF_2)_4CH_2OH$
$C_5H_{11}OCH_2(CF_2)_4CH_2OH$
$C_6H_{13}OCH_2(CF_2)_4CH_2OH$

The foregoing describes my invention in its preferred aspects, and illustrates my invention by way of specific embodiments and specific examples, but alterations and modifications may be made thereof without departing from the invention herein disclosed and claimed.

Having described my invention, I claim:

1. The method of making a tris fluorinated alkyl phosphate in which the fluorinated alkyl radicals are selected from the group consisting of a fluorinated alkyl radical having from 2 to 10 carbon atoms and having at least two fluorine atoms on a carbon atom bonded to the carbinol carbon atom and the carbinol carbon atom in addition to being bonded to oxygen is bonded only to atoms which are members of the group consisting of hydrogen and carbon and a fluorinated alkoxyalkyl radical having at least two fluorine atoms on a carbon atom bonded to the carbinol carbon atom and the carbinol carbon atom in addition to being bonded to oxygen is bonded only to atoms which are members of the group consisting of hydrogen and carbon and having at least two carbon atoms in the alkyl portion thereof, which comprises reacting phosphorous oxychloride with an aqueous solution of an alkali metal salt of a member of the group consisting of a fluorinated alkanol having at least two fluorine atoms on a carbon atom bonded to the carbinol carbon atom and the carbinol carbon atom in addition to being bonded to oxygen is bonded only to atoms which are members of the group consisting of hydrogen and carbon and a fluorinated alkoxyalkanol having at least two fluorine atoms on a carbon atom bonded to the carbinol carbon atom and the carbinol carbon atom in addition to being bonded to oxygen is bonded only to atoms which are members of the group consisting of hydrogen and carbon and having at least two carbon atoms in the alkyl portion thereof.

2. The method as defined in claim 1 in which the alkali metal salt of a fluorinated alcohol is a sodium alcoholate.

3. The method of making a tri-fluoroalkyl phosphate which comprises reacting phosphorous oxychloride with an aqueous solution of an alkali metal salt of a fluorinated alcohol having from 2 to 10 carbon atoms and having at least two fluorine atoms on a carbon atom bonded to the carbinol carbon atom and the carbinol carbon atom in addition to being bonded to oxygen is bonded only to atoms which are members of the group consisting of hydrogen and carbon and thereby substituting fluoroalkoxy radicals for the chlorine of the phosphorous oxychloride.

4. The method as defined in claim 3 in which the alkali metal salt of the fluorinated alcohol is a sodium alcoholate.

5. The method as defined in claim 1 in which the reaction of phosphorous oxychloride with the alkali metal alcoholate is carried out at a temperature below 10° C.

6. The method as defined in claim 1 in which the reaction of phosphorous oxychloride with the alkali metal alcoholate is carried out at a temperature within the range of —5° C. to +5° C.

7. The method as defined in claim 3 in which the reaction of phosphorous oxychloride with the alkali metal alcoholate is carried out at a temperature below 10° C.

8. The method as defined in claim 3 in which the reaction of phosphorous oxychloride with the alkali metal alcoholate is carried out at a temperature within the range of —5° C. to +5° C.

References Cited in the file of this patent

UNITED STATES PATENTS 2,559,749     Benning     July 10, 1951

OTHER REFERENCES

Swarts: Rec. Trav. Chim., vol. 28, pp. 166 to 170 (1909).

Evans et al.: J. Chem. Soc., pp. 1310 to 1313 (1930).

Groggins: Unit Processes in Organic Synthesis, 2d ed., pp. 564–5 (1938).

Adler: Chemical Industries, vol. 51, p. 516 (1942).

Nature, vol. 158, p. 384, Sept. 14, 1946.